United States Patent
Brissette

(10) Patent No.: US 12,199,439 B2
(45) Date of Patent: Jan. 14, 2025

(54) ROBUST AND CYBERSECURE COORDINATED UNINTENTIONAL ISLAND DETECTION FOR MICROGRIDS

(71) Applicant: Hitachi Energy USA Inc., Raleigh, NC (US)

(72) Inventor: Alexander Brissette, Raleigh, NC (US)

(73) Assignee: Hitachi Energy USA Inc., Raleigh, NC (US)

( * ) Notice: Subject to any disclaimer, the term of this patent is extended or adjusted under 35 U.S.C. 154(b) by 411 days.

(21) Appl. No.: 17/830,958

(22) Filed: Jun. 2, 2022

(65) Prior Publication Data

US 2023/0396071 A1 Dec. 7, 2023

(51) Int. Cl.
*H02J 3/38* (2006.01)
*H02J 3/10* (2006.01)
*H02J 13/00* (2006.01)

(52) U.S. Cl.
CPC ............... *H02J 3/388* (2020.01); *H02J 3/10* (2013.01); *H02J 13/00002* (2020.01); *H02J 13/00032* (2020.01)

(58) Field of Classification Search
CPC ........ H02J 3/388; H02J 3/10; H02J 13/00032; H02J 13/00002
See application file for complete search history.

(56) References Cited

U.S. PATENT DOCUMENTS

| 11,728,676 B2 * | 8/2023 | Nagakura | ............... H02J 3/388 700/287 |
| 2012/0146423 A1 * | 6/2012 | Bodewes | ................ H02M 7/49 307/84 |
| 2015/0015301 A1 | 1/2015 | Laaksonen | |
| 2019/0267794 A1 * | 8/2019 | Vu | ............................ H02H 3/38 |

(Continued)

FOREIGN PATENT DOCUMENTS

| EP | 2806280 A1 | 11/2014 |
| EP | 3996231 A1 | 5/2022 |

OTHER PUBLICATIONS

North American Electric Reliability Corporation, "1,200 MW Fault Induced Solar Photovoltaic Resource Interruption Disturbance Report", Jun. 2017, Version 1.0, www.nerc.com, 38 pages.

(Continued)

*Primary Examiner* — Mohammad Ali
*Assistant Examiner* — Vincent W Chang
(74) *Attorney, Agent, or Firm* — Procopio, Cory, Hargreaves & Savitch LLP

(57) ABSTRACT

Unintentional islanding (UI) of a circuit of distributed energy resources (DERs) may leave area electrical power systems (EPS), external to the DER circuit, energized. Thus, UI detection methods have been developed to detect unintentional islanding and trigger a UI response. However, individual UI detection methods have various deficiencies. Thus, a consensus-based UI detection process is disclosed that builds a consensus from multiple UI detection sources, (Continued)

optionally implementing different UI detection methods. The redundancy in this consensus-based UI detection process provides robust, sensitive, selective, and cybersecure UI detection for the entire DER circuit. For example, the consensus-based UI detection process may eliminate or reduce non-detection zones, avoid false positives, thwart cyber-attacks, and/or the like.

18 Claims, 3 Drawing Sheets

(56) References Cited

U.S. PATENT DOCUMENTS

| | | | | |
|---|---|---|---|---|
| 2020/0091723 | A1* | 3/2020 | Nagakura | H02J 3/381 |
| 2022/0085607 | A1* | 3/2022 | Shijo | H02J 3/46 |
| 2023/0378765 | A1* | 11/2023 | Liu | H02J 3/381 |

OTHER PUBLICATIONS

Ropp et al., "Analysis and Performance Assessment of the Active Frequency Drift Method of Islanding Prevention", IEEE Transactions on Energy Conversion, vol. 14, No. 3, Sep. 1999, School of Electrical and Computer Engineering Georgia Institute of Technology, Atlanta GA, p. 810 to 816.

Stevens et al., "Development and Testing of an Approach to Anti-Islanding in Utility-Interconnected Photovoltaic Systems", Sandia Report, SAND2000-1939 Unlimited Release Printed Aug. 2000, Issued by Sandia National Laboratories, NM, USA, operated for the United States Department of Energy by Sandia Corporation, 63 pages.

IEEE Standards Coordinating Committe 21, "IEEE Standard for Interconnection and Interoperability of Distributed Energy Resources with Associated Electric Power Systems Interfaces", IEEE Std 1547-2018 (Revision of IEEE Std 1547-2003), 138 pages, Apr. 6, 2018, printed in USA.

Bower et al., "Evaluation of Islanding Detection Methods for Photovoltaic Utility-Interactive Power Systems", Report IEA PVPS T5-09: 2002, Mar. 2002, Task V (Grid Interconnection of Building Integrated and Other Dispersed Photovoltaic Power Systems), 59 pages.

De Mango, et al., "Overview of Anti-Islanding Algorithms for PV Systems. Part I: Passive Methods", 2006, EPE-PEMC 2006, Portoroz, Slovenia, 1-4244-0121-6/06, p. 1878-1883.

De Mango, et al., "Overview of Anti-Islanding Algorithms for PV Systems. Part II: Active Methods", 2006, EPE-PEMC 2006, Portoroz, Slovenia, 1-4244-0121-6/06, p. 1884-78-1889.

Sharma et al., "Unintentional Islanding Detection in Microgrid," 2017 International Conference on Energy, Communication, Data Analytics and Soft Computing (ICECDS), 978-1-5386-1887-5/17, 2017, p. 2519-2523.

Ding et al., "Islanding Detection for Distributed Generation", St. Peterburg Powertech 2005, Jun. 27-30, 2005 in Russia, 4 pages.

Auguence et al., "Non-detection zone of an anti-islanding protection with rate of change of frequency threshold", 24th International Conference & Exhibition on Electricity Distribution (CIRED), Jun. 12-15, 2017, Session 3: Operation, control and protection, ISSN 2515-0855, doi: 10.1049/oap-cired.2017.0352, www.ietdl.org, p. 1338-1341.

Sareen et al., "Universal islanding detection technique based on rate of change of sequence components of currents for distributed generations", IET Renewable Power Generation Research Article, IET Journals, The Institution of Engineering and Technology, 2016, vol. 10, Iss. 2, p. 228-237, ISSN 1752-1416.

* cited by examiner

FIG. 1
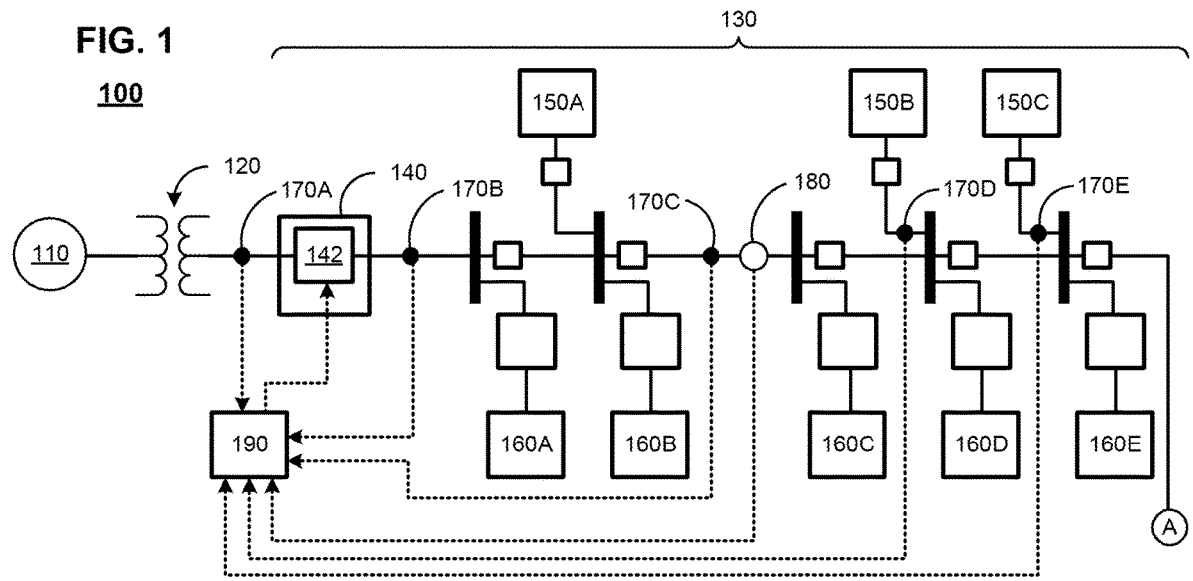
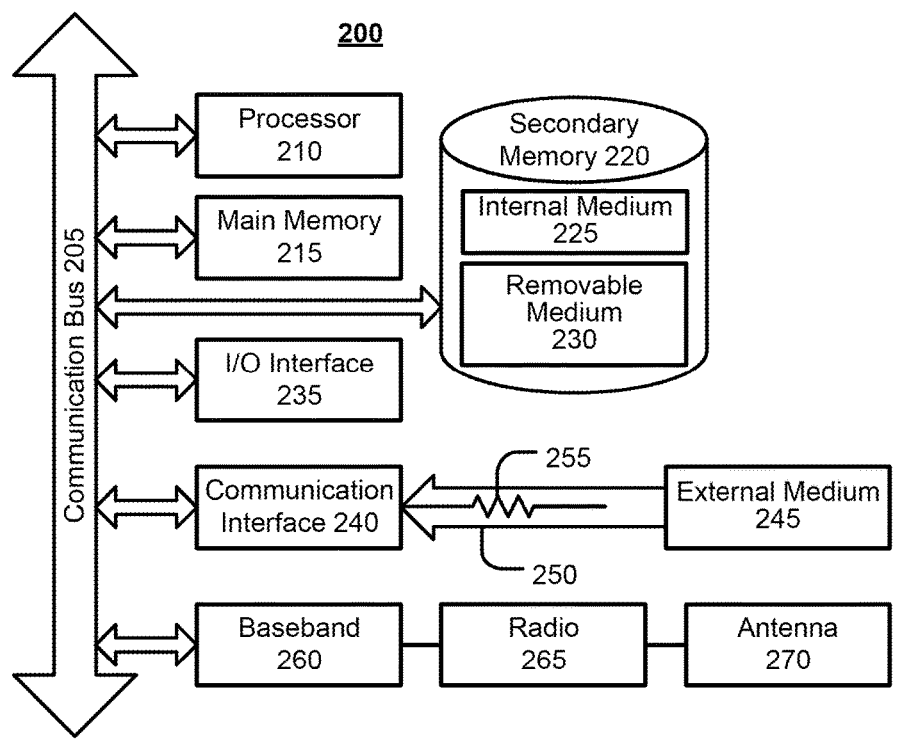
FIG. 2

ROBUST AND CYBERSECURE COORDINATED UNINTENTIONAL ISLAND DETECTION FOR MICROGRIDS

GOVERNMENT LICENSE RIGHTS

This invention was made with U.S. Government support under Contract No. DE-awarded by the Department of Energy. The U.S. Government has certain rights in this invention.

BACKGROUND

Field of the Invention

The embodiments described herein are generally directed to coordinated island detection, and, more particularly, to robust, sensitive, selective, and cybersecure coordinated unintentional island (UI) detection for distributed energy resource (DER) circuits, such as microgrids.

Description of the Related Art

Grid codes generally require that an interconnection with a distributed energy resource must detect and cease to energize unintentional islands accurately and quickly. New grid codes extend this requirement to the single point of common coupling (PCC) between a microgrid and the main grid. For microgrids operating under the Institute of Electrical and Electronics Engineers (IEEE) Standard for Interconnection and Interoperability of Distributed Energy Resources with Associated Electric Power Systems Interface (IEEE 1547-2018) or a similar grid code, the UI response requirements are the same as for a standalone distributed energy resource. IEEE 1547-2018 defines an unintentional island as an island scenario in which the DER circuit energizes a portion of the area electrical power systems (EPS) through the point of common coupling. However, as used herein, the term "unintentional island" may be understood to refer to any scenario in which one or more distributed energy resources become unintentionally isolated from the rest of the power system and continue to supply power, such that they may energize components of the power system.

Typical operation of a microgrid as an intentional island involves disconnection from the area EPS along predefined electrical boundaries (e.g., the point of common coupling). If an island forms outside these electrical boundaries, so as to include both the microgrid and electrical system components in the area EPS that are not part of the microgrid, the microgrid is required to detect the unintentional island and cease to energize the non-microgrid components. For example, if a fault causes a microgrid and a transformer, positioned upstream of the point of common coupling with the microgrid, to become isolated from the main grid, the microgrid must quickly cease to energize the transformer.

Mango et al., "Overview of Anti-Islanding Algorithms for PV Systems. Part I: Passive Methods," 12th Int'l Power Electronics and Motion Control Conference, 2006, pp. 1878-1883, provides an overview of some existing anti-islanding algorithms. The present disclosure is directed to overcoming one or more of the problems discovered in state-of-the-art algorithms.

SUMMARY

Accordingly, systems, methods, and non-transitory computer-readable media are disclosed for robust, sensitive, selective, and cybersecure coordinated UI detection for DER circuits, including microgrids. An objective of embodiments is to build a consensus from multiple UI detection sources, using one or more levels of redundancy, before triggering a UI response, such as a transition to an intentional island in which area EPS are de-energized. A further objective of some embodiments is to eliminate or reduce non-detection zones within UI detection methods. A further objective of some embodiments is to prevent false positives asserted by UI detection sources from triggering a UI response. A further objective of some embodiments is to prevent compromised UI detection sources from supporting a cyber-attack intended to island a DER circuit, such as a microgrid.

In an embodiment, a method is disclosed for detecting unintentional islanding (UI) of a distributed energy resource (DER) circuit, the method comprising using at least one hardware processor to: monitor transmissions from a plurality of UI detection sources to identify indications of unintentional islanding from the plurality of UI detection sources; and perform detection of unintentional islanding of the DER circuit by, while indications of unintentional islanding are identified during a time window from fewer than a consensus number of the plurality of UI detection sources, determining that unintentional islanding is not detected, wherein the consensus number is greater than one, and, when indications of unintentional islanding are identified during the time window from the consensus number of the plurality of UI detection sources, determining that unintentional islanding is detected.

The transmissions from one or more of the plurality of UI detection sources may each comprise a plurality of measurements, and the method may comprise identifying the indication of unintentional islanding in the transmission from each of the one or more UI detection sources by: for each of the plurality of measurements, determining whether the measurement satisfies a respective measurement threshold; when a threshold number of the plurality of measurements satisfy the respective measurement threshold, determining that an indication of unintentional islanding is identified in the transmission, wherein the threshold number is greater than one; and, when the threshold number of the plurality of measurements do not satisfy the respective measurement threshold, determining that an indication of unintentional islanding is not identified in the transmission. The plurality of measurements may comprise a positive rate of change of frequency and a negative rate of change of frequency. The plurality of measurements may comprise a rate of change of positive sequence component of current and a rate of change of negative sequence component of current. The plurality of measurements may comprise a positive rate of change of frequency, a negative rate of change of frequency, a rate of change of positive sequence component of current, and a rate of change of negative sequence component of current.

The method may comprise using the at least one hardware processor to, when the indication of unintentional islanding is identified in the transmission from a first one of the plurality of UI detection sources: determine whether the first UI detection source is local to the DER circuit or remote from the DER circuit; when determining that the first UI detection source is local to the DER circuit, determining whether or not to perform the detection of unintentional islanding of the DER circuit based on a location of the first UI detection source within the DER circuit; and, when determining that the first UI detection source is remote to the DER circuit, performing the detection of unintentional islanding of the DER circuit. Determining whether or not to perform the detection of unintentional islanding of the DER circuit based on a location of the first UI detection source within the DER circuit may comprise: determining whether or not the first UI detection source is downstream from a segmenting device within the DER circuit; when determining that the first UI detection source is not downstream from the segmenting device, performing the detection of unintentional islanding of the DER circuit; and, when determining that the first UI detection source is downstream from the segmenting device, determining whether or not the segmenting device is in an open state, when determining that the segmenting device is not in the open state, performing the detection of unintentional islanding of the DER circuit, and, when determining that the segmenting device is in the open state, not performing the detection of unintentional islanding of the DER circuit.

The method may further comprise using the at least one hardware processor to, when the indication of unintentional islanding is identified in the transmission from a first one of the plurality of UI detection sources: start a timer representing the time window and perform the detection of unintentional islanding of the DER circuit from the start of the timer; and block transition of the DER circuit to an intentional island unless and until unintentional islanding of the DER circuit is detected prior to expiration of the timer.

The method may further comprise using the at least one hardware processor to, in response to detecting unintentional islanding of the DER circuit, initiate a transition of the DER circuit to an intentional island. Initiating a transition of the DER circuit to an intentional island may comprise preparing the DER circuit for the intentional island. The method may further comprise using the at least one hardware processor to, after preparing the DER circuit for the intentional island, open a point of common coupling with the DER circuit.

At least one of the plurality of UI detection sources may utilize a different UI detection method to produce the indication of unintentional islanding than another one of the plurality of UI detection sources.

The transmissions from one or more of the plurality of UI detection sources may each comprise a binary value indicating either a presence or absence of unintentional islanding.

Any of the methods above may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 illustrates an example DER circuit for which one or more of the disclosed processes may be implemented, according to an embodiment;

FIG. 2 illustrates an example processing system, by which one or more of the processes described herein, may be executed, according to an embodiment;

DETAILED DESCRIPTION

Figure 3:
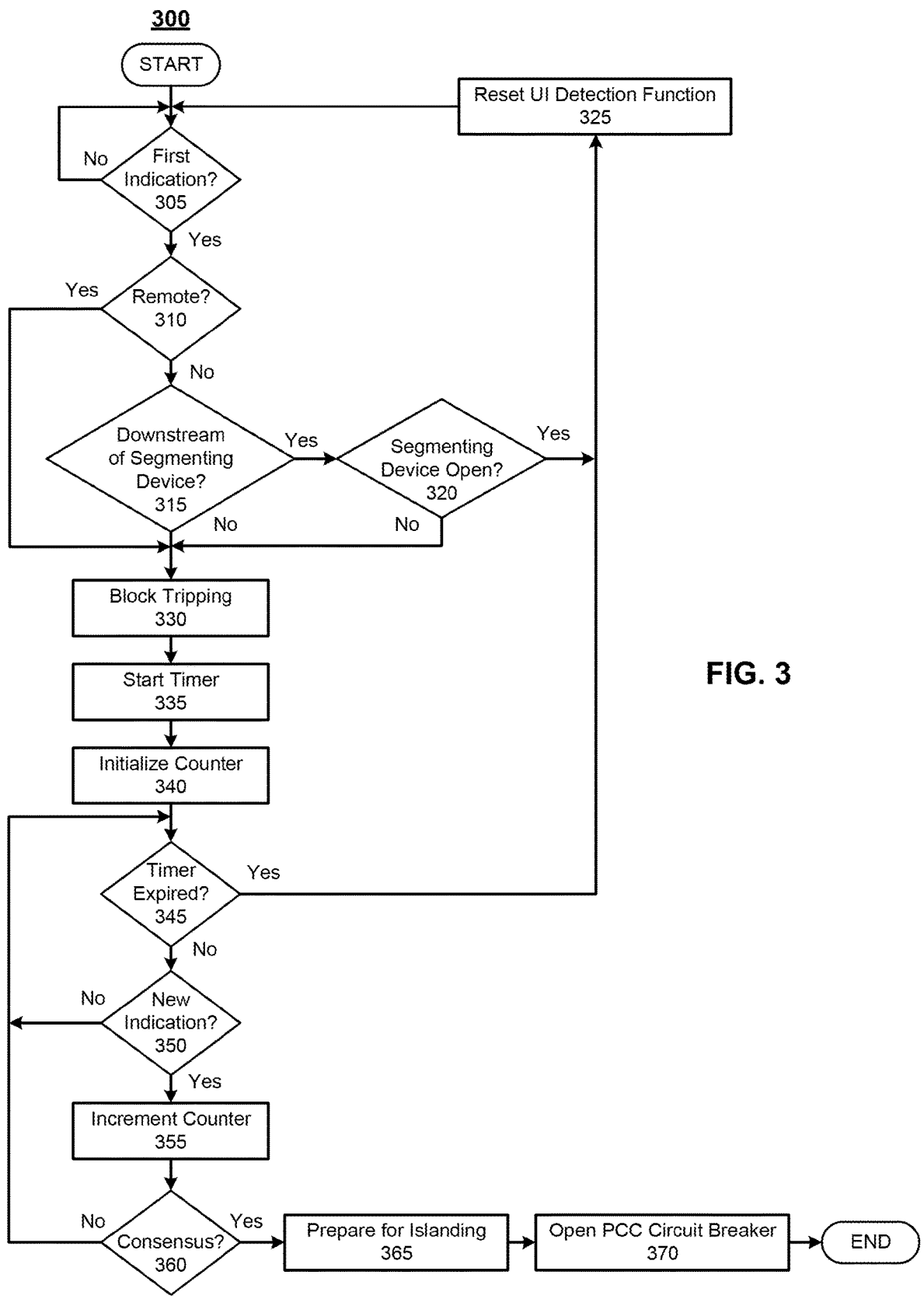
FIG. 3 illustrates an example process for consensus-based UI detection, according to an embodiment.

In an embodiment, systems, methods, and non-transitory computer-readable media are disclosed for robust, sensitive, selective, and cybersecure coordinated UI detection for DER circuits, including microgrids. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Conventional methods of UI detection can be grouped into three general categories: passive; active; and remote. Passive UI detection monitors for particular anomalies indicating an island condition in measurements of voltage and current waveforms. Examples of such measurements include under/over-voltage, rate of change of frequency (ROCOF), and voltage vector shift (VVS). In general, these passive UI detection methods work because immediately following the loss of connection to a stiff, high-inertia grid, parameters, such as voltage, frequency, and phase experience a disturbance. While passive UI detection methods are simple to implement, they suffer from two major drawbacks.

The first drawback to passive UI detection methods is the presence of non-detection zones (NDZs). A non-detection zone is the range of net active and reactive power load within which the island condition cannot be detected. For example, the real and reactive power load in an islanded DER circuit may be nearly balanced by the DER supply, such that almost no power is exchanged with the area EPS. As a result, when the island forms, there will not be a significant change in the frequency or phase of the voltage waveform in the islanded DER circuit.

The second drawback to passive UI detection methods is nuisance tripping. Nuisance tripping refers to a scenario in which an island is falsely indicated because a measurement exceeds a threshold, used for detecting unintentional islanding, as a result of a non-islanding event. For example, a sudden large change in load within a microgrid may cause a large change in voltage, thereby falsely triggering a UI detection. Nuisance tripping can produce a cascading effect, which can have a damaging impact on the area EPS, as in the 2016 Blue Cut fire event in Southern California. IEEE 1547-2018 addresses nuisance tripping by setting ride-through requirements for several common passive UI indicators (e.g., ROCOF and VVS). Nuisance tripping is not allowed under conditions where ride-through would be required.

In active UI detection methods, a distributed energy resource will control the voltage and/or current at its terminal in conflict with the area EPS. Under normal conditions, this conflict has no impact on the area EPS, because the distributed energy resource is very small relative to the bulk grid. However, when the distributed energy resource is islanded, this conflict forces the voltage waveform to deviate from its normal operation and quickly cross some threshold. Examples of active UI detection include active frequency drift, Sandia frequency drift, impedance measurement, and reactive power control.

In active frequency drift, a distributed energy resource distorts its output current so that one cycle of the current waveform is shorter than the grid voltage period. When the distributed energy resource becomes islanded, the short current cycle will force the island frequency to quickly rise and exceed a measurement threshold. Thus, unintentional islanding can be indicated when the island frequency exceeds the measurement threshold.

Sandia frequency drift improves upon active frequency drift by adding a feedback loop in which the chopping factor is a function of the frequency. Sandia frequency drift eliminates the non-detection zone of active frequency drift by quickly driving the island frequency to the measurement threshold when the islanding causes a small frequency deviation. Thus, again, unintentional islanding can be indicated when the island frequency exceeds the measurement threshold.

In impedance measurement, the distributed energy resource applies a perturbation to its output current signal. If a corresponding perturbation is measured in the voltage signal, the distributed energy resource is islanded. Thus, unintentional islanding can be indicated when the corresponding perturbation is measured in the voltage signal.

During operation, if distributed energy resource(s) generate reactive power in excess of the local reactive power demand, the excess will be exported to the grid through the point of common coupling. In the event of islanding, this excess reactive power can no longer be measured at the point of common coupling. Thus, in reactive power control, an unintentional island can be indicated when the difference between the expected reactive power and the actual reactive power, at the point of common coupling, exceeds a measurement threshold.

While active UI detection methods generally have a small or no non-detection zone, they present potential problems in power quality. This is especially true in an EPS with high DER penetration. In this case, many distributed energy resources, each independently injecting distortion, may cause problems, while also making the UI detection method less effective. In addition, active UI detection methods can only be implemented by the distributed energy resources themselves, since other components (e.g., relays, microgrid controllers, etc.) are unable to directly control voltage or frequency waveforms.

Remote UI detection methods are based on communications between a distributed energy resource or a microgrid and an upstream management system, such as a Supervisory Control and Data Acquisition (SCADA) system, of the area EPS. Examples of remote UI detection methods include power line carrier signals and transfer-trip. While remote UI detection methods can be effective, they are potentially slow and require costly communications overhead, especially relative to UI detection methods that are native to DER equipment and, therefore, cost nothing to the operator of the area EPS.

FIG. 1 illustrates an example DER circuit 130 for which one or more of the disclosed processes may be implemented, according to an embodiment. A grid 110 may be electrically connected to a DER circuit 130 via a point of common coupling 140. A transformer 120 may exist between grid 110 and point of common coupling 140 to transform the voltage level between grid 110 and DER circuit 130. Point of common coupling 140 may comprise a circuit breaker 142 configured to switch between a closed state, in which DER circuit 130 is electrically connected to grid 110, and an open state, in which DER circuit 130 is electrically disconnected or "islanded" from grid 110 and the area EPS (e.g., comprising transformer 120).

DER circuit 130 may comprise one or a plurality of distributed energy resources 150 (e.g., 150A, 150B, and 150C) and one or a plurality of loads 160 (e.g., 160A, 160B, 160C, 160D, and 160E). Examples of distributed energy resources 150 include, without limitation, photovoltaic cells, synchronous generators, gas turbines, wind turbines, biomass generators, fuel cells, battery energy storage system (BESS), electric vehicles, and anything else that may generate and/or supply power. Examples of loads 160 may include electric vehicles, appliances, machinery, and anything else that consumes power. DER circuit 130 may comprise distributed energy resources 150 of different types or consist of distributed energy resources 150 of the same type. Similarly, DER circuit 130 may comprise loads 160 of different types or consist of loads 160 of the same type.

A plurality of UI detection sources 170 (e.g., 170A, 170B, 170C, 170D, and 170E) may be distributed locally within DER circuit 130 (e.g., 170B-170E) and/or remotely outside DER circuit 130 (e.g., 170A). Each UI detection source 170 may comprise a device designed to continually or continuously measure one or more parameters at a position within an electrical circuit. For example, UI detection source 170A measures parameter(s) at a point between transformer 120 and point of common coupling 140, and UI detection source 170B measures parameter(s) at a point on the other side of point of common coupling 140 between point of common coupling 140 and the remainder of DER circuit 130. Other UI detection sources 170 (e.g., 170C, 170D, and 170E) may be distributed throughout the remainder of DER circuit 130. Each UI detection source 170 may measure the same one or more parameters at its respective position as every other UI detection source 170 or may measure a different set of one or more parameters than one or more other UI detection sources 170. Similarly, each UI detection source 170 may utilize the same UI detection method or may utilize a different UI detection method than one or more other UI detection sources 170. A UI detection source 170 may be any device capable of measuring and outputting the value of a parameter, including a microgrid controller, relay, distributed energy resource 150, and/or the like, as well as a device dedicated to detecting unintentional islands.

Each UI detection source 170 may communicate with a controller 190. For example, each UI detection source 170 may transmit a message or signal to controller 190 directly or indirectly via wired or wireless communication. For instance, UI detection sources 170 and controller 190 may each be connected to a network, and UI detection sources 170 may transmit to controller 190 over the network. Communication between UI detection sources 170 and controller 190 may be performed using a digital communications protocol, such as Distributed Network Protocol 3 (DNP3) or the International Electrotechnical Commission's (IEC) 61850 standard, or may be based on a simple digital or analog input/output. A UI detection source 170 may transmit the value of each measured parameter continually (e.g., periodically at predefined intervals), continuously, or in response to a triggering event. A triggering event may comprise a request from controller 190, the detection of unintentional islanding locally at UI detection source 170 based on the measured parameter(s), and/or the like. Alternatively, a UI detection source 170 may only transmit when unintentional islanding is detected locally at the UI detection source 170, or may continually or continuously transmit a binary indication of whether unintentional islanding is detected locally at the UI detection source 170. In other words, the UI detection source 170 may simply transmit a message or signal that indicates that unintentional islanding has been detected, without including the specific measured parameter(s). As another alternative, a UI detection source 170 may report the difference between a measured parameter and a respective measurement threshold, instead of the value of the measured parameter itself. This difference value represents a severity of the measured parameter. It should be understood that different UI detection sources 170 may utilize different ones of these communication types, and controller 190 may be configured to receive and process each type of communication.

DER circuit 130 may comprise one or more segmenting devices 180. Each segmenting device 180 may be configured to switch between a closed state, in which two or more segments of DER circuit 130 are electrically connected to each other, and an open state, in which the two or more segments of DER circuit 130 are electrically disconnected or segmented from each other. When segmenting device 180 is in the open state, a local island may be formed within DER circuit 130. Examples of segmenting device 180 include a recloser, circuit breaker, and the like.

Each segmenting device 180 may communicate with controller 190. For example, each segmenting device 180 may transmit a message or signal to controller 190 directly or indirectly via wired or wireless communication. For instance, segmenting device(s) 180 and controller 190 may each be connected to a network, and segmenting device(s) 180 may transmit to controller 190 over the network. A segmenting device 180 may transmit an indication of state, such as whether segmenting device is in the closed state or the open state, to controller 190, such that controller 190 is capable of forming decisions based on the state of segmenting device 180.

Controller 190, which may be comprised in a SCADA system of DER circuit 130, monitors the transmissions from UI detection sources 170 to identify any indications of unintentional islanding from UI detection sources 170 and trigger a response based on a consensus scheme, as described elsewhere herein. In other words, controller 190 may implement the process of UI detection and response described herein. The response may comprise controlling PCC circuit breaker 142 to switch to the open state, thereby disconnecting DER circuit 130 from all external components, including transformer 120. This control may be referred to as intentional islanding. Thus, controller 190 may detect an unintentional island, based on consensus within the transmissions from UI detection sources 170, and responsively transition DER circuit to an intentional island. Controller 190 may communicate directly with PCC circuit breaker 142 or may communicate with PCC circuit breaker 142 over a network to which both controller 190 and circuit breaker 142 are connected.

While DER circuit 130 is depicted with a certain arrangement and number of components, including PCC circuit breaker 142, distributed energy resources 150, loads 160, UI detection sources 170, segmenting devices 180, and controller 190, this is merely one non-limiting example for the purposes of illustration. It should be understood that DER circuit 130 may comprise any different arrangement and/or any different number of components. In addition, DER circuit 130 may be connected to one or more other DER circuits, for example, at point A. It should be understood that DER circuit 130 may be, or be comprised in, a microgrid.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of controller 190, UI detection sources 170, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

Baseband system 260 may be communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

FIG. 3 illustrates an example process 300 for consensus-based UI detection, according to an embodiment. Process 300 may be implemented by controller 190 within a supervisory control layer of DER circuit 130. Process 300 may be implemented as software that is executed by one or more processors (e.g., 210) of controller 190. Alternatively, process 300 may be implemented as a hardware component (e.g., integrated circuit (IC), application-specific integrated circuit (ASIC), digital signal processor (DSP), field-programmable gate array (FPGA) or other programmable logic device, discrete gate or transistor logic, etc.). To clearly illustrate the interchangeability of hardware and software, the various subprocesses of process 300 are described herein in terms of their functionality. Whether such functionality is implemented as hardware or software depends upon the particular application and design constraints imposed on the overall system. A skilled person can implement the described functionality in varying ways for each particular application. In addition, the grouping of functions within process 300 is for ease of description. In alternative embodiments, these functions can be grouped differently. Furthermore, while process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 305, controller 190 monitors transmissions from UI detection sources 170 to identify indications of unintentional islanding within the transmissions. In an embodiment in which a UI detection source 170 only transmits when unintentional islanding is detected, an indication of unintentional islanding may be identified whenever a transmission is received from that UI detection source 170. In an embodiment in which a UI detection source 170 continually or continuously transmits a binary value indicating the presence or absence of unintentional islanding, an indication of unintentional islanding may be identified whenever the binary value indicates the presence of unintentional islanding. In an embodiment in which a UI detection source 170 continually or continuously transmits the values of one or more parameter(s), an indication of unintentional islanding may be identified whenever a transmission is received from that UI detection source 170 that comprises parameter(s) satisfying one or more criteria. For example, in the case that the UI detection source 170 transmits a single parameter, unintentional islanding may be identified from the transmission when the parameter value satisfies a threshold (e.g., exceeds a threshold or falls below a threshold, depending on the parameter). In the case that the UI detection source 170 transmits a plurality of parameters, unintentional islanding may be identified from the transmission when a threshold number or percentage of the parameter values each satisfy a respective threshold. It should be understood that there are numerous other means by which indications of unintentional islanding may be represented and identified in transmissions, and that disclosed embodiments do not rely on any particular means. When the first indication is identified (i.e., "Yes" in subprocess 305), process 300 proceeds to subprocess 310. Otherwise, if the first indication is yet to be identified (i.e., "No" in subprocess 305), process 300 continues to wait for the first indication in subprocess 305.

In subprocess 310, controller 190 determines whether the first indication of unintentional islanding, identified in subprocess 305, was received from a remote UI detection source 170. A remote UI detection source 170 may be any UI detection source 170 that is external to DER circuit 130, such as UI detection source 170A, between grid 110 and point of common coupling 140, or a UI detection source within or otherwise associated with grid 110 (e.g., transmitted by a utility distribution control system). In contrast, a local UI detection source 170 may be any UI detection source 170 that is internal to DER circuit 130, such as UI detection sources 170B-170E. Whereas an indication of unintentional islanding from a remote UI detection source 170 is indicative of an external island, an indication of unintentional islanding from a local UI detection source 170 may be the result of another event, such as the tripping of a segmenting device 180 within DER circuit 130, which does not require the entire DER circuit 130 to transition to an intentional island. If segmenting device 180 switches to the open state, for example, to form an internal island (e.g., as a protection action in response to a non-UI event), this may cause UI detection sources 170D and 170E, downstream from segmenting device 180 (i.e., on the other side of segmenting device 180 as point of common coupling 140), to erroneously indicate unintentional islanding of DER circuit 130. When the first indication of unintentional islanding is received from a local UI detection source 170 (i.e., "No" in subprocess 310), process 300 proceeds to subprocess 315. Otherwise, when the first indication of unintentional islanding was received from a remote UI detection source 170 (i.e., "Yes" in subprocess 310), process 300 proceeds to subprocess 330.

In subprocess 315, controller 190 determines whether or not the first indication of unintentional islanding, identified in subprocess 305, was received from a local UI detection source 170 that is downstream from a segmenting device 180. Controller 190 may comprise or have access to memory (e.g., 215 or 220) that stores a representation of the topology of DER circuit 130. As one example, the representation of the topology may comprise an identifier of all UI detection sources 170 that are downstream from a segmenting device 180. In the illustrated example, UI detection sources 170D and 170E are downstream from segmenting device 180, whereas UI detection sources 170A, 170B, and 170C are upstream from segmenting device 180. Regardless of the particular representation, controller 190 may access the representation of the topology to determine whether the UI detection source 170, from which the first indication of unintentional islanding was received, is downstream from a segmenting device 180. If the first indication is received from a local UI detection source 170 that is downstream from a segmenting device 180 (i.e., "Yes" in subprocess 315), process 300 proceeds to subprocess 320. Otherwise, if the first indication is received from a local UI detection source 170 that is not downstream from a segmenting device 180 (i.e., "No" in subprocess 315), process 300 proceeds to subprocess 330.

In subprocess 320, controller 190 determines whether or not the segmenting device 180 that is upstream from the UI detection source 170, from which the first indication of unintentional islanding was received, is in the open state. If the segmenting device 180 is in the open state (i.e., "Yes" in subprocess 320), process 300 proceeds to subprocess 325. In this case, DER circuit 130 is engaged in a normal protection operation, without external islanding. In other words, controller 190 stops the consensus algorithm when it becomes apparent that the first indication of unintentional islanding is an internal event. On the other hand, if the segmenting device 180 is in the closed state (i.e., "No" in subprocess 320), process 300 proceeds to subprocess 330.

In subprocess 325, controller 190 resets the consensus-based UI detection function, without initiating any UI response. In other words, the first indication of unintentional islanding, which was identified in a transmission from a UI detection source 170 that is downstream from an opened segmenting device 180, is ignored or forgotten. Controller 190 returns to subprocess 305 to monitor transmissions from UI detection sources 170 for a new first indication of unintentional islanding.

In subprocess 330, controller 190 may, if necessary, block tripping based on the first indication of unintentional islanding. For example, if there is another mechanism within DER circuit 130 (e.g., within a SCADA system of DER circuit 130, within individual UI detection sources 170, etc.) that is configured to trigger a control, such as tripping of PCC circuit breaker 142, based on a single indication of unintentional islanding or based on the detection of unintentional islanding at a single UI detection source 170, controller 190 may suppress or override this mechanism or control. For example, controller 190 may issue a blocking command to all UI detection sources 170, when the first indication of unintentional islanding is received, to suppress any control function, such that no individual UI detection source 170 triggers a control. Thus, no UI-based tripping will occur in DER circuit 130 until controller 190 detects unintentional islanding based on a consensus. In other words, DER circuit 130 will continue operating normally until process 300 detects unintentional islanding based on a consensus. Notably, if the first indication of unintentional islanding is a false positive or a malicious cyberattack, subprocess 330 will prevent the false positive or cyberattack from triggering any control within DER circuit 130. In an embodiment in which controller 190 is the only mechanism for triggering such control, subprocess 330 may be omitted.

Subprocess 330 may be particularly applicable when distributed energy resources 150 comprise embedded UI detection functions. For example, anti-islanding is a standard function in modern distributed energy resources 150, but is typically internal with no exposed communication interface to outside systems. Thus, it may not be possible for controller 190 to access UI detection measurements and signals within distributed energy resources 150. In other words, controller 190 may not be able to utilize the UI detection function of a distributed energy resource 150 in the consensus algorithm. In this case, the UI detection function of the distributed energy resource 150 should be blocked altogether to solve at least two problems. Firstly, the internal anti-islanding function of a distributed energy resource 150 is fast and autonomous, whereas the consensus algorithm relies on some delay, between the first instance of UI detection and the cessation of energization, to build the consensus. Subprocess 330 may prevent the distributed energy resource 150 from ceasing energization until and unless consensus is reached. Secondly, since distributed energy resources 150 are able to control their voltage and current waveforms, they are more likely to use active UI detection methods. However, without a connection to the stiff, high-inertia grid 110, to absorb or attenuate the waveform distortions introduced by active UI detection methods, the power quality in an islanded DER circuit 130 may degrade. By blocking these active UI detection methods, subprocess 330 may prevent this degradation of power quality.

In subprocess 335, controller 190 starts a timer to determine when a predetermined time window, from the time at which the first indication of unintentional islanding was received, has expired. In addition, in subprocess 340, a counter is initialized (e.g., to a value of one, representing receipt of the first indication of unintentional islanding). Until the timer has expired, any additional indications of unintentional islanding will be counted towards building a consensus. When the timer expires without a consensus having been obtained (i.e., "Yes" in subprocess 345), process 300 proceeds to subprocess 325 to reset the consensus-based UI detection function. Otherwise, if the timer has not yet expired (i.e., "No" in subprocess 345), process 300 continues waiting for a consensus in subprocess 350.

In subprocess 350, controller 190 monitors transmissions from UI detection sources 170 to identify new indications of unintentional islanding within the transmissions. It should be understood that the transmission monitoring in subprocess 350 may be identical or similar to the transmission monitoring in subprocess 305, except that the reception of a new indication in subprocess 305 starts the consensus building, whereas the reception of a new indication in subprocess 350 adds to the consensus building. When a new indication is identified (i.e., "Yes" in subprocess 350), controller 190 increments the counter in subprocess 355 and proceeds to subprocess 360. Otherwise, if a new indication is yet to be identified (i.e., "No" in subprocess 350), process 300 continues to wait for either the timer to expire or a consensus to be reached. In an embodiment, incrementation of a counter may be replaced by a more complex calculation that, for example, combines a representation of severity in the indications (e.g., differences between measurements and respective measurement thresholds) into an aggregate or composite representation of the overall state of severity.

In subprocess 360, controller 190 determines whether or not a consensus has been reached. This determination in subprocess 360 may utilize any one of a variety of potential schemes for building a consensus (i.e., more than one indication of unintentional islanding) before detecting an unintentional island. A number of such consensus-based schemes will now be described. However, it should be understood that the described schemes are non-limiting, and that any different consensus-based scheme may be utilized in subprocess 360. An advantage of disclosed embodiments is achieved by requiring a plurality of indications of unintentional islanding to be identified before performing any control (e.g., tripping PCC circuit breaker 142) that disrupts normal operation of DER circuit 130, to thereby suppress or diminish the effect of a false positive or cyber-attack on DER circuit 130. Thus, in each of the schemes unintentional islanding is not detected while indications are received from fewer than a consensus number of UI detection sources 170 and/or fewer than a consensus number of indications are received from UI detection sources 170. Conversely, unintentional islanding is detected when indications are received from the consensus number of UI detection sources 170 and/or the consensus number of indications are received from UI detection sources 170. This consensus number, which may be determined from a predefined count, percentage, or the like, can be set according to the particular design goals of the implementation (e.g., a desired confidence level). However, it should be understood that the consensus number should be set so as to require more than one UI detection source 170 and/or more than one indication.

In a first scheme, a consensus may be reached (i.e., "Yes" in subprocess 360) when indications of unintentional islanding are received from a threshold number or percentage of different UI detection sources 170. In the illustrated example, there are five UI detection sources 170A, 170B, 170C, 170D, and 170E. In this case, the counter may be incremented each time a new indication is identified from a previously unseen UI detection source 170. If the threshold number is three (or the threshold percentage is 60%), consensus will be reached when the counter reaches three. This is an example of a single-level consensus-based scheme.

In a second scheme, a consensus may be reached (i.e., "Yes" in subprocess 360) when a threshold number or percentage of indications of unintentional islanding are received. This scheme may be applicable when a single UI detection source 170 transmits measurements of one or a plurality of parameters, which may each individually indicate unintentional islanding. For example, a measured value of a parameter that satisfies a respective predefined measurement threshold may be identified as an indication of unintentional islanding. In the illustrated example, there are five UI detection sources 170A, 170B, 170C, 170D, and 170E. Assume that each UI detection source 170 transmits measurements of four parameters that may each individually indicate unintentional islanding (e.g., if satisfying a respective threshold), for a total of twenty possible indications of unintentional islanding. In this case, the counter may be incremented each time a measurement from any UI detection source 170 satisfies the respective measurement threshold. If the threshold number is fifteen (or the threshold percentage is 75%), consensus will be reached when the counter reaches fifteen. This is another example of a single-level consensus-based scheme.

In a third scheme, a consensus may be reached (i.e., "Yes" in subprocess 360) when indications of unintentional islanding are identified from the transmissions of a threshold number or percentage of different UI detection sources 170, where an indication of unintentional islanding is not identified in the transmission from a UI detection source 170 unless a threshold number or percentage of measurements indicate an unintentional island. This scheme may be applicable when a single UI detection source 170 transmits measurements of a plurality of parameters, which may each individually indicate unintentional islanding. For example, a measured value of a parameter that satisfies a respective predefined measurement threshold may be identified as an indication of unintentional islanding. In the illustrated example, there are five UI detection sources 170A, 170B, 170C, 170D, and 170E. Assume that each UI detection source 170 transmits measurements of four parameters that may each individually indicate unintentional islanding (e.g., if satisfying a respective threshold). In this case, the counter may be incremented each time a threshold number of measurements from a previously unseen UI detection source 170 satisfy their respective measurement thresholds. If the threshold number of different UI detection sources 170 is three (or the threshold percentage is 60%) and the threshold number of measurements is three (or the threshold percentage is 75%), consensus will be reached when the counter reaches three, indicating that each of three UI detection sources has reported at least three measurements that satisfy their respective measurement thresholds. This is an example of a two-level consensus-based scheme.

Notably, UI detection sources 170 that monitor measurements for a plurality of parameters may be configured to locally determine whether or not a threshold number or percentage of the measurements satisfy their respective thresholds. In this case, each UI detection source 170 may only transmit an indication of unintentional islanding when that UI detection source 170 locally determines that the threshold number or percentage of measurements satisfy their respective thresholds. In this case, controller 190 may determine that consensus is reached when a threshold number or percentage of UI detection sources 170 transmit an indication of unintentional islanding. While, technically, this is an example of a two-level consensus-based scheme, from the perspective of controller 190, it is a single-level consensus-based scheme that can be implemented by controller 190 in an identical manner as the first described scheme.

In a fourth scheme, a consensus may be reached (i.e., "Yes" in subprocess 360) when a threshold number or percentage of different UI detection sources 170 indicate an unintentional island and a threshold number or percentage of measurements across all UI detection sources 170 indicate an unintentional island. This scheme may be applicable when a single UI detection source 170 transmits measurements of a plurality of parameters, which may each individually indicate unintentional islanding. For example, a measured value of a parameter that satisfies a respective predefined measurement threshold may be identified as an indication of unintentional islanding. In the illustrated example, there are five UI detection sources 170A, 170B, 170C, 170D, and 170E. Assume that each UI detection source 170 transmits measurements of four parameters that may each individually indicate unintentional islanding (e.g., if satisfying a respective threshold). In this case, there may be a first counter that tracks the number of different UI detection sources 170 which have transmitted a measurement that indicates unintentional islanding, and a second counter that tracks the total number of measurements, transmitted by any UI detection source 170, that indicate unintentional islanding. If the threshold number of different UI detection sources 170 is three (or the threshold percentage is 60%) and the threshold number of measurements is fifteen (or the threshold percentage is 75%), consensus will be reached when the first counter reaches three and the second counter reaches fifteen. This is another example of a two-level consensus-based scheme.

In a fifth scheme, a consensus may be reached (i.e., "Yes" in subprocess 360) when indications of unintentional islanding are identified from the transmissions of a threshold number or percentage of different UI detection sources 170, where an indication of unintentional islanding is not identified in the transmission from a UI detection source 170 unless a threshold number or percentage of measurements indicate an unintentional island, and a threshold number or percentage of measurements across all UI detection sources 170 indicate an unintentional island. This scheme may be applicable when a single UI detection source 170 transmits measurements of a plurality of parameters, which may each individually indicate unintentional islanding. For example, a measured value of a parameter that satisfies a respective predefined measurement threshold may be identified as an indication of unintentional islanding. In the illustrated example, there are five UI detection sources 170A, 170B, 170C, 170D, and 170E. Assume that each UI detection source 170 transmits measurements of four parameters that may each individually indicate unintentional islanding (e.g., if satisfying a respective threshold). In this case, a first counter may be incremented each time a threshold number of measurements from a previously unseen UI detection source 170 satisfy their respective measurement thresholds, and a second counter may be incremented each time a measurement from any UI detection source 170 satisfies its respective threshold. If the threshold number of different UI detection sources 170 is three (or the threshold percentage is 60%), the threshold number of measurements from a UI detection source 170 is three (or the threshold percentage is 75%), and the threshold number of measurements across all UI detection sources 170 is sixteen (or the threshold percentage is 80%), consensus will be reached when the first counter reaches three, indicating that each of three UI detection sources has reported at least three measurements that satisfy their respective measurement thresholds, and the second counter reaches sixteen. This is an example of a three-level consensus-based scheme.

In any embodiment in which UI detection sources 170 may utilize different UI detection methods, a hybrid scheme may be used. For example, some UI detection sources 170 may transmit a locally determined indication of unintentional islanding or a measurement of a single parameter, whereas other UI detection sources 170 may transmit measurements for a plurality of parameters. In this case, the counter may be incremented whenever controller 190 identifies an indication of unintentional islanding in the transmission, but controller 190 may identify each indication in different manners depending on the UI detection source 170 from which the transmission was received. For example, if a locally determined indication of unintentional islanding is received, controller 190 may increment the counter. If a transmission consisting of a measurement of a single parameter is received, controller 190 may increment the counter only if the measurement satisfies a respective measurement threshold. If a transmission comprising measurements of a plurality of parameters is received, controller 190 may increment the counter only if a threshold number or percentage of those measurements satisfy respective measurement thresholds. Regardless of how the indications from different UI detection sources 170 are identified, controller 190 may determine that a consensus has been reached when the counter reaches a consensus threshold (i.e., "Yes" in subprocess 360).

In a sixth scheme, a consensus may be reached (i.e., "Yes" in subprocess 360) when an overall severity of the indications reaches a consensus threshold. This scheme may be applicable when UI detection sources 170 transmit a difference, between each measurement and its respective measurement threshold, representing the severity of the measured parameter. Alternatively, UI detection sources 170 may transmit measurements, and controller 190 may calculate the differences between the measurements and their respective measurement thresholds. In either case, the differences may be combined in some manner, and the result may be compared to the consensus threshold. Notably, in this scheme, the counter is not a simple incremental counter. Rather, subprocess 355 may comprise a more complex calculation that combines an aggregate difference or other representation of aggregate severity with a difference in the new indication of unintentional islanding identified in subprocess 350. As a result, the consensus is not based on whether or not UI detection sources 170 agree that an unintentional island has occurred. Rather, the consensus is based on whether or not DER circuit 130, as a whole, has reached an aggregate state of severity that indicates unintentional islanding.

The sixth scheme can be further improved if UI detection sources 170 utilize different UI detection methods. For example, consider two UI detection sources 170 that utilize two different UI detection methods with two different non-detection zones. At the moment an unintentional island occurs, the net power change may be within the non-detection zone of a first one of the UI detection sources 170, but outside the non-detection zone of a second one of the UI detection sources 170. In this case, the first UI detection source 170 will not provide an indication of unintentional islanding, whereas the second UI detection source 170 will provide an indication of unintentional islanding. If the consensus algorithm only knows that the second UI detection source 170 is indicating an unintentional island, while the first UI detection source 170 is not indicating an unintentional island, no UI response will be triggered. However, if the consensus algorithm knows that the second UI detection source 170 is indicating a measured parameter well beyond its respective measurement threshold and the first UI detection source 170 is indicating a measured parameter very near, but not quite at, its respective measurement threshold, the aggregate state of severity may be sufficient to trigger a UI response.

In any of the schemes which utilizes the measurement of one or more parameters, the parameters may comprise any parameter that may be indicative of an unintentional island. Examples of such parameters include, without limitation, under/over-voltage, under/over-frequency, rate of change of frequency, voltage vector shift, rate of change of frequency over power (df/dP), total harmonic distortion (THD), rate of change of symmetrical components, and/or the like. It should be understood that a single UI detection source 170 may measure one or any combination of a plurality, including potentially all, of these parameters, as well as other parameters not specifically described herein.

With respect to under/over-voltage or under/over-frequency, in the absence of a stiff, high-inertia grid 110, the voltage and/or frequency of an unintentional island can rise or fall. This is especially likely if there is an imbalance between the power generation by distributed energy resources 150 and loads 160 inside the island. Thus, an unintentional island may be indicated if the voltage or frequency exceeds a first measurement threshold or falls below a second measurement threshold.

With respect to the rate of change of frequency, in the absence of a high-inertia grid 110, the frequency in the unintentional island may change rapidly due to an imbalance between the power generated by distributed energy resources 150 and loads 160 inside the island. Thus, an unintentional island may be indicated if the rate of change of frequency (i.e., the derivative of the frequency) exceeds a measurement threshold. The positive and negative rate of change of frequency may be calculated as two separate parameters or as a single parameter.

With respect to voltage vector shift, a sudden loss of the voltage reference from grid 110 can cause a step change in the phase of the voltage inside DER circuit 130. Thus, the voltage signal period may be tracked, and an unintentional island may be indicated if the difference between the measured signal period and a reference exceeds a measurement threshold.

With respect to the rate of change of frequency over power, under normal grid-connected conditions, a change in the power, output by distributed energy resources 150, would not result in a significant change in frequency within DER circuit 130. However, without a connection to a high-inertia grid 110, step changes in the output power can result in large changes in frequency. Thus, the value of the rate of change in frequency over the rate of change in power (i.e., df/dP) may be tracked, and an unintentional island may be indicated if this value exceeds a measurement threshold.

With respect to total harmonic distortion, when DER circuit 130 loses the connection to grid 110, the high-frequency components of the current, output by distributed energy resources 150, may experience an increase in impedance, which results in an increase in the total harmonic distortion of the voltage. Thus, an unintentional island may be indicated if the total harmonic distortion exceeds a measurement threshold.

With respect to the rate of change of symmetrical components (e.g., positive and negative sequence), an unintentional island may cause a disturbance in the symmetry of three-phase current waveforms. Thus, an unintentional island may be indicated if the rate of change of the magnitude of the positive or negative sequence components exceeds a measurement threshold.

Regardless of the particular scheme and/or measurements used, when consensus has been reached (i.e., "Yes" in subprocess 360), process 300 proceeds to subprocess 365. Otherwise, if consensus has not been reached (i.e., "No" in subprocess 360), process 300 continues to wait for either the timer to expire or a consensus to be reached.

In subprocess 365, controller 190 may initiate preparation for islanding. Preparation for islanding may comprise any steps required to transition DER circuit 130 to an intentional island (i.e., prior to opening PCC circuit breaker 142). Such steps may comprise configuring various components of DER circuit 130, including, without limitation, managing loads 160 to prepare them for islanding, changing the control mode of DER circuit 130 or one or more distributed energy resources 150 within DER circuit 130 from grid-following to grid-forming, providing voltage and frequency references, performing load-shedding as needed, and/or the like.

In subprocess 370, controller 190 may initiate the transition of PCC circuit breaker 142 from the closed state to the open state. For example, controller 190 may communicate directly or indirectly (e.g., via a network) with PCC circuit breaker 142 to transmit a control command or signal that causes PCC circuit breaker 142 to open. After PCC circuit breaker 142 has transitioned to the open state, representing an intentional island, DER circuit 130 may operate in an islanded mode. Process 300 may end until PCC circuit breaker 142 transitions back to the closed state, at which time process 300 may be restarted. In other words, process 300 may operate whenever PCC circuit breaker 142 is in the closed state and cease operation whenever PCC circuit breaker 142 is in the open state.

Notably, once PCC circuit breaker 142 has been opened, the area EPS, including transformer 120, is no longer energized by DER circuit 130, in compliance with the applicable grid code. DER circuit 130 may continue to operate in the islanded mode.

Figure 4:
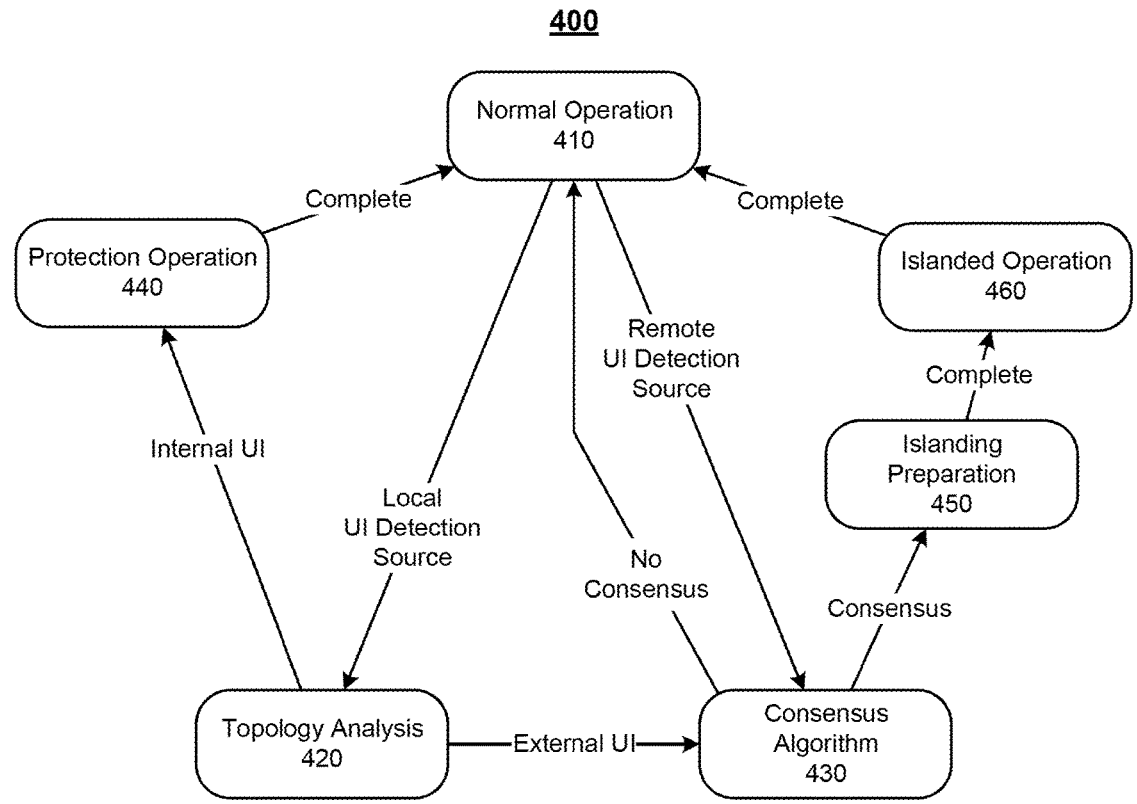
FIG. 4 illustrates an example state diagram for consensus-based UI detection, according to an embodiment.

FIG. 4 illustrates an example state diagram 400 for consensus-based UI detection, according to an embodiment. State diagram 400 may implemented by controller 190 within a supervisory control layer of DER circuit 130. While state diagram 400 is illustrated with a certain arrangement of states, state diagram 400 may be implemented with fewer, more, or different states and a different arrangement of states.

In state 410, DER circuit 130 operates normally (e.g., corresponding to subprocess 305), while connected to the area EPS. If an indication of unintentional islanding is received from a local UI detection source 170 (e.g., corresponding to "No" in subprocess 310) during normal operation 410, controller 190 transitions to topology analysis 420 (e.g., corresponding to subprocesses 315 and 320) to locate the source of the indication. If an indication of unintentional islanding is received from a remote UI detection source 170 (e.g., corresponding to "Yes" in subprocess 310) during normal operation 410, controller 190 transitions to consensus algorithm 430 (e.g., corresponding to subprocesses 330-360). At this point, controller 190 will not yet know whether a real island has formed, or if the UI detection logic was tripped for another reason, such as nuisance tripping based on a false positive or a cyberattack.

From topology analysis 420, if the UI detection is indicative of an internal island, controller 190 transitions to protection operation 440, which may involve a reconfiguration of DER circuit 130. Once protection operation 440 is complete, controller 190 transitions from protection operation 440 to normal operation 410. On the other hand, if the UI detection is indicative of an external island, controller 190 transitions from topology analysis 420 to consensus algorithm 430.

From consensus algorithm 430, if no consensus is reached within the predefined time window (e.g., corresponding to "Yes" in subprocess 345), controller 190 transitions back to normal operation 410. Otherwise, if consensus is reached within the predefined time window (e.g., corresponding to "Yes" in subprocess 360), controller 190 transitions from consensus algorithm 430 to islanding preparation 450 (e.g., corresponding to subprocess 365). Once islanding preparation 450 is complete, controller 190 transitions from islanding preparation 450 to islanded operation 460 (e.g., corresponding to subprocess 370), in which DER circuit 130 is disconnected from the area EPS. Once islanded operation 460 has been completed (e.g., the electrical connection to grid 110 is restored), controller 190 transitions from islanded operation 460 to normal operation 410.

The applicable grid code for DER circuit 130 may constrain the time period by which DER circuit 130 must detect and respond to an unintentional island. For example, the IEEE 1547 standards require a DER circuit 130 to detect and de-energize unintentional islands within two seconds of their formation. Thus, controller 190 should be capable of executing process 300 within this time constraint defined by the grid code.

Figure 5:
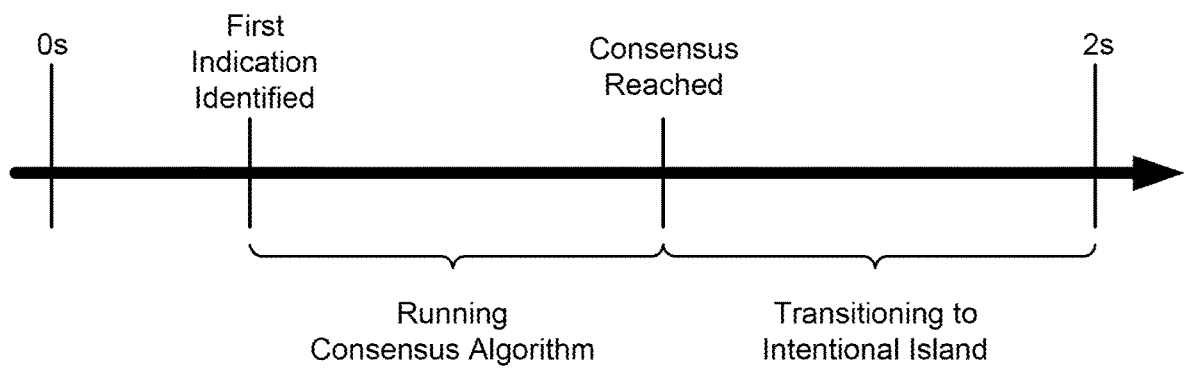
FIG. 5 illustrates an example timing of a process for consensus-based UI detection, according to an embodiment.

FIG. 5 illustrates an example timing of process 300 for consensus-based UI detection, according to an embodiment in which the time constraint, specified by the applicable grid code, is two seconds. As illustrated, after the first indication of intentional islanding is identified (e.g., in subprocess 305), controller 190 begins running the consensus algorithm (e.g., comprising subprocesses 330-360). Once consensus has been reached (e.g., "Yes" in subprocess 360), controller 190 initiates the transition of DER circuit to an intentional island (e.g., subprocesses 365 and 370).

The consensus algorithm and transitioning should be capable of being performed within the specified time period (e.g., two seconds). Thus, the length of the timer used in the consensus algorithm (e.g., started in subprocess 335) should be set so as to be sufficient to capture enough indications of unintentional islanding to satisfy the consensus threshold, but short enough to enable the transition to an intentional island within the applicable time constraint, while accounting for latencies in communications, processing, and/or the like. For example, the length of the timer may be calculated as the time constraint minus the maximum time duration required for a UI detection source 170 to communicate an indication of unintentional islanding to controller 190, minus the maximum time duration required for the transition to an intentional island, potentially minus a buffer time duration. For example, if the time constraint is two seconds, communication between UI detection source 170 and controller 190 requires a maximum of 50 milliseconds, and the transition to an intentional island requires a maximum of 1 second, the length of the timer may be set to 950 milliseconds.

The disclosed consensus-based or coordinated UI detection has numerous advantages over conventional UI detection based on individual UI detection sources (e.g., monitored only at the point of common coupling). For example, the redundant and consensus-based approach of using a plurality of UI detection sources 170, distributed across multiple locations within and/or outside DER circuit 130, to trigger a UI response when the number of positive indications has reached a threshold, improves the sensitivity (i.e., ability to correctly detect unintentional islanding regardless of the size of the disturbance), selectivity (i.e., ability to ignore disturbances that are not caused by unintentional islanding), and resilience to cyberattacks (i.e., ability to ignore malicious false positives) of DER circuit 130. In addition, in an embodiment, different types of UI detection sources 170 may be utilized, to introduce diversity or robustness into the consensus-based UI detection process.

The sensitivity of any single UI detection method is limited by the UI detection method and the position of the UI detection source 170 within DER circuit 130. Process 300 can improve the overall sensitivity of UI detection for DER circuit 130, since the utilization of multiple UI detection sources 170 and/or multiple parameters ensures that the most sensitive UI detection method for each given situation will be operating during UI detection. For example, the utilization of multiple UI detection sources 170 and/or multiple parameters, which may have overlapping detection zones, effectively reduces or eliminates the non-detection zones present in conventional passive UI detection methods. Thus, process 300 is capable of detecting unintentional islands that conventional passive UI detection methods are not.

Events other than unintentional islanding can cause disturbances that may produce an indication of unintentional islanding under certain UI detection methods. For example, a voltage-based method may be tripped due to a large change in load, whereas a frequency-based method would ignore the same disturbance. Process 300 can improve the selectivity of UI detection, since the utilization of multiple UI detection sources 170 and/or multiple parameters prevents such nuisance tripping. In particular, since a consensus is required, a single false positive cannot trigger a UI response. The types and arrangement of UI detection sources 170 may be selected to prevent all such false positives from triggering a UI response. Thus, process 300 is capable of preventing nuisance tripping, as required by applicable grid codes.

Process 300 can also improve the resilience of UI detection to cyber-attacks. For example, the utilization of multiple UI detection sources 170 increases redundancy to prevent compromised UI detection sources 170 from triggering a UI response. In particular, the requirement of a consensus prevents a single or small set of compromised UI detection sources 170 from using false positive indications to trigger a UI response for the entire DER circuit 130. In other words, if a compromised UI detection source 170 generates a false positive, in an effort to trigger a UI response (e.g., to take DER circuit 130 offline), process 300 prevents the cyber-attack by requiring the unintentional islanding to be confirmed by one or more different UI detection sources 170 before triggering a UI response. In order for a cyber-attack to be successful, a malicious actor would need to compromise the threshold number of UI detection sources 170. Notably, the cyber-resilience of DER circuit 130 may be scaled up by increasing the number of UI detection sources 170 within DER circuit 170 and/or the threshold number of UI detection sources 170 required for consensus.

Notably, process 300 is also computationally inexpensive (i.e., does not require significant computing resources). Thus, process 300 can be incorporated into an existing controller 190 of DER circuit 130. In addition, process 300 is capable of executing within the time constraint imposed by the applicable grid code. During experimentation involving several different scenarios, process 300 was capable of detecting a true unintentional island within 0.3-0.4 seconds, which is well within the two-second time constraint imposed by IEEE 1547-2018, while successfully ignoring false positives.

As discussed elsewhere herein, a UI detection source 170 may measure one or more parameters. In an embodiment, one or more, including potentially all, UI detection sources 170 measure a plurality of parameters, such as positive rate of change of frequency, negative rate of change of frequency, rate of change of positive sequence components, and/or rate of change of negative sequence components. Each measured parameter represents a distinct UI detection function by which an unintentional island may be detected. In particular, each measured parameter may be compared to a respective measurement threshold, and if the measured parameter satisfies the respective measurement threshold (e.g., exceeds the threshold in the case of the four example parameters mentioned above), be used to indicate the potential of an unintentional island.

The respective measurement threshold for each UI detection function (i.e., measured parameter) may be tuned to strike the appropriate balance between sensitivity and selectivity. Notably, different measurement thresholds may be used for different UI detection sources 170, based, for example, on their positions within DER circuit 130. In addition, in a scheme which requires a threshold number or percentage of the measurements to satisfy the respective measurement threshold, that threshold may also be set to strike the appropriate balance between sensitivity and selectivity. Furthermore, the consensus threshold number or percentage of UI detection sources 170 from which an indication of unintentional islanding must be received before detecting an unintentional island may also be set to strike the appropriate balance between sensitivity, selectivity, and cyber-resilience. In other words, there are multiple levels that may be tuned, based on experimentation (e.g., simulation) and design goals (e.g., the applicable time constraint), to strike the appropriate balance between sensitivity, selectivity, and/or cyber-resilience.

The table below illustrates one particular example of the measurement thresholds for different example parameters (i.e., positive and negative rate of change of frequency, rate of change of positive sequence current, and rate of change of negative sequence current) measured by each of UI detection sources 170A-170E in DER circuit 130:

| Thresholds for Individual UI Detection Functions of Plurality of UI Detection Sources | | | | | |
|---|---|---|---|---|---|
| | UI Detection Source | | | | |
| Parameter | 170A | 170B | 170C | 170D | 170E |
| Pos./Neg. ROCOF (Hz/s) | +/−0.3 | +/−0.3 | +/−0.3 | +/−0.3 | +/−0.3 |
| ROCO Pos. Seq. Current (pu/s) | 70 | 70 | 200 | 0.5 | 0.15 |
| ROCO Neg. Seq. Current (pu/s) | 70 | 70 | 200 | 0.5 | 0.15 |

In an embodiment, a different consensus algorithm may be utilized depending on one or more characteristics of DER circuit 130 (e.g., load conditions, net steady-state power, etc.). For example, a first consensus algorithm may be utilized in process 300 when the net steady-state power, crossing point of common coupling 140, is outside the overall non-detection zone, and a second consensus algorithm may be utilized in process 300 when the net steady-state power, crossing point of common coupling 140, is within the overall non-detection zone. The overall non-detection zone may be identified in advance through system study of the various non-detection zones in the passive UI detection methods utilized by UI detection sources 170. The first and second consensus algorithms may differ in various respects, including, without limitation, whether or not tripping is blocked in subprocess 330, the various measurement thresholds (e.g., different measurement thresholds based on load conditions), the consensus threshold, the consensus-based scheme, and/or the like. For example, in the first consensus algorithm (i.e., utilized when power is outside the overall non-detection zone), the internal active UI detection methods of distributed energy resources 150 may be blocked in subprocess 330, whereas, in the second consensus algorithm (i.e., utilized when power is inside the overall non-detection zone), subprocess 330 may be omitted, such that no blocking occurs. Thus, distributed energy resources 150 may continue to exercise their internal active UI detection methods in situations in which the passive UI detection methods may be incapable of detecting unintentional islanding.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of detecting unintentional islanding (UI) of at least one distributed energy resource (DER) circuit, the method comprising using at least one hardware processor to:
monitor transmissions from a plurality of UI detection sources to identify indications of unintentional islanding from the plurality of UI detection sources; and
perform detection of unintentional islanding of the DER circuit by,
while indications of unintentional islanding are identified during a time window from fewer than a consensus number of the plurality of UI detection sources, determining that unintentional islanding is not detected, wherein the consensus number is greater than one, and,
when indications of unintentional islanding are identified during the time window from the consensus number of the plurality of UI detection sources, determining that unintentional islanding is detected;
wherein the transmissions from one or more of the plurality of UI detection sources each comprises a plurality of measurements, and wherein the method comprises identifying the indication of unintentional islanding in the transmission from each of the one or more UI detection sources by:
for each of the plurality of measurements, determining whether the measurement satisfies a respective measurement threshold;
when a threshold number of the plurality of measurements satisfy the respective measurement threshold, determining that an indication of unintentional islanding is identified in the transmission, wherein the threshold number is greater than one; and,
when the threshold number of the plurality of measurements do not satisfy the respective measurement threshold, determining that an indication of unintentional islanding is not identified in the transmission.

2. The method of claim 1, wherein the plurality of measurements comprises a positive rate of change of frequency and a negative rate of change of frequency.

3. The method of claim 1, wherein the plurality of measurements comprises a rate of change of positive sequence component of current and a rate of change of negative sequence component of current.

4. The method of claim 1, wherein the plurality of measurements comprises a positive rate of change of frequency, a negative rate of change of frequency, a rate of change of positive sequence component of current, and a rate of change of negative sequence component of current.

5. The method of claim 1, comprising using the at least one hardware processor to, when the indication of unintentional islanding is identified in the transmission from a first one of the plurality of UI detection sources:
determine whether the first UI detection source is local to the DER circuit or remote from the DER circuit;
when determining that the first UI detection source is local to the DER circuit, determining whether or not to perform the detection of unintentional islanding of the DER circuit based on a location of the first UI detection source within the DER circuit; and, when determining that the first UI detection source is remote to the DER circuit, performing the detection of unintentional islanding of the DER circuit.

6. The method of claim 5, wherein determining whether or not to perform the detection of unintentional islanding of the DER circuit based on a location of the first UI detection source within the DER circuit comprises:
determining whether or not the first UI detection source is downstream from a segmenting device within the DER circuit;
when determining that the first UI detection source is not downstream from the segmenting device, performing the detection of unintentional islanding of the DER circuit; and,
when determining that the first UI detection source is downstream from the segmenting device,
determining whether or not the segmenting device is in an open state,
when determining that the segmenting device is not in the open state, performing the detection of unintentional islanding of the DER circuit, and,
when determining that the segmenting device is in the open state, not performing the detection of unintentional islanding of the DER circuit.

7. The method of claim 1, further comprising using the at least one hardware processor to, when the indication of unintentional islanding is identified in the transmission from a first one of the plurality of UI detection sources:
start a timer representing the time window and perform the detection of unintentional islanding of the DER circuit from the start of the timer; and
block transition of the DER circuit to an intentional island unless and until unintentional islanding of the DER circuit is detected prior to expiration of the timer.

8. The method of claim 1, further comprising using the at least one hardware processor to, in response to detecting unintentional islanding of the DER circuit, initiate a transition of the DER circuit to an intentional island.

9. The method of claim 8, wherein initiating a transition of the DER circuit to an intentional island comprises preparing the DER circuit for the intentional island.

10. The method of claim 9, further comprising using the at least one hardware processor to, after preparing the DER circuit for the intentional island, open a point of common coupling with the DER circuit.

11. The method of claim 1, wherein at least one of the plurality of UI detection sources utilizes a different UI detection method to produce the indication of unintentional islanding than another one of the plurality of UI detection sources.

12. The method of claim 1, wherein the transmissions from one or more of the plurality of UI detection sources each comprises a binary value indicating either a presence or absence of unintentional islanding.

13. A system comprising:
a control system comprising
at least one hardware processor, and
software configured to, when executed by the at least one hardware processor,
monitor transmissions from a plurality of UI detection sources to identify indications of unintentional islanding from the plurality of UI detection sources, and
perform detection of unintentional islanding of the DER circuit by,
while indications of unintentional islanding are identified during a time window from fewer than a consensus number of the plurality of UI detection sources, determining that unintentional islanding is not detected, wherein the consensus number is greater than one, and,
when indications of unintentional islanding are identified during the time window from the consensus number of the plurality of UI detection sources, determining that unintentional islanding is detected,
wherein the transmissions from one or more of the plurality of UI detection sources each comprises a plurality of measurements, and wherein the software is further configured to identify the indication of unintentional islanding in the transmission from each of the one or more UI detection sources by:
for each of the plurality of measurements, determining whether the measurement satisfies a respective measurement threshold;
when a threshold number of the plurality of measurements satisfy the respective measurement threshold, determining that an indication of unintentional islanding is identified in the transmission, wherein the threshold number is greater than one; and,
when the threshold number of the plurality of measurements do not satisfy the respective measurement threshold, determining that an indication of unintentional islanding is not identified in the transmission.

14. The system of claim 13, further comprising the plurality of UI detection sources.

15. The system of claim 14, further comprising the DER circuit, wherein the plurality of UI detection sources are distributed at different locations with respect to the DER circuit.

16. The system of claim 15, wherein the DER circuit is a microgrid comprising one or more distributed energy resources.

17. The system of claim 14, wherein at least one of the plurality of UI detection sources utilizes a different UI detection method to produce the indication of unintentional islanding than another one of the plurality of UI detection sources.

18. A non-transitory computer-readable medium having instructions stored thereon, wherein the instructions, when executed by a processor, cause the processor to:
monitor transmissions from a plurality of UI detection sources to identify indications of unintentional islanding from the plurality of UI detection sources; and
perform detection of unintentional islanding of the DER circuit by,
while indications of unintentional islanding are identified during a time window from fewer than a consensus number of the plurality of UI detection sources, determining that unintentional islanding is not detected,
wherein the consensus number is greater than one, and, when indications of unintentional islanding are identified during the time window from the consensus number of the plurality of UI detection sources, determining that unintentional islanding is detected;
wherein the transmissions from one or more of the plurality of UI detection sources each comprises a plurality of measurements, and wherein instructions comprise identifying the indication of unintentional islanding in the transmission from each of the one or more UI detection sources by:

for each of the plurality of measurements, determining whether the measurement satisfies a respective measurement threshold;

when a threshold number of the plurality of measurements satisfy the respective measurement threshold, determining that an indication of unintentional islanding is identified in the transmission, wherein the threshold number is greater than one; and, when the threshold number of the plurality of measurements do not satisfy the respective measurement threshold, determining that an indication of unintentional islanding is not identified in the transmission.

\* \* \* \* \*